(12) United States Patent
Xie et al.

(10) Patent No.: US 11,000,912 B2
(45) Date of Patent: May 11, 2021

(54) AUTOMATIC SOLDER PASTE FEEDING SYSTEM

(71) Applicants: Tyco Electronics (Shanghai) Co. Ltd., Shanghai (CN); TE Connectivity Corporation, Berwyn, PA (US); Measurement Specialties (Chengdu) Ltd., Chengdu (CN); Shenzhen AMI Technology Co. Ltd., Shenzhen (CN)

(72) Inventors: Fengchun Xie, Shanghai (CN); Dandan Zhang, Shanghai (CN); Roberto Francisco-Yi Lu, Bellevue, WA (US); Lvhai Hu, Shanghai (CN); Qinglong Zeng, Shenzhen (CN); Lan Gong, Chengdu (CN); Qian Ying, Chengdu (CN); Yingcong Deng, Shanghai (CN); Yun Liu, Shanghai (CN)

(73) Assignees: Tyco Electronics (Shanghai) Co. Ltd., Shanghai (CN); TE Connectivity Corporation, Berwyn, PA (US); Measurement Specialties (Chengdu) Ltd., Chengdu (CN); Shenzhen AMI Technology Co. Ltd., Shenzhen (CN)

( * ) Notice: Subject to any disclaimer, the term of this patent is extended or adjusted under 35 U.S.C. 154(b) by 0 days.

(21) Appl. No.: 16/532,614

(22) Filed: Aug. 6, 2019

(65) Prior Publication Data

US 2019/0358722 A1    Nov. 28, 2019

Related U.S. Application Data

(63) Continuation of application No. PCT/EP2018/056546, filed on Mar. 15, 2018.

(30) Foreign Application Priority Data

Mar. 17, 2017    (CN) .......................... 201710160006.9

(51) Int. Cl.
| | | |
|---|---|---|
| *B23K 3/00* | (2006.01) | |
| *B23K 3/06* | (2006.01) | |
| *B23K 101/36* | (2006.01) | |

(52) U.S. Cl.
CPC ........ *B23K 3/0638* (2013.01); *B23K 2101/36* (2018.08)

(58) Field of Classification Search
CPC .......... B23K 3/08; B23K 1/08; B23K 3/0646; B23K 3/0653; B23K 1/0016; B23K 1/085;
(Continued)

(56) References Cited

U.S. PATENT DOCUMENTS

| | | |
|---|---|---|
| 3,815,806 A | 6/1974 | Paxton |
| 4,396,140 A | 8/1983 | Jaffe et al. |

(Continued)

FOREIGN PATENT DOCUMENTS

| | | |
|---|---|---|
| JP | S5874274 A | 5/1983 |
| JP | H01122127 A | 5/1989 |

(Continued)

OTHER PUBLICATIONS

WO-2008067620-A1 computer english translation (Year: 2008).*

(Continued)

*Primary Examiner* — Erin B Saad
(74) *Attorney, Agent, or Firm* — Barley Snyder

(57) ABSTRACT

An automatic solder paste feeding system, comprising: a base, a container mounted on the base and configured to contain a solder paste therein, a syringe mounted on the base and configured to inject the solder paste into the container, and a heater mounted on the base and configured to heat the solder paste contained in the container, so that the solder paste is melted into liquid state.

11 Claims, 1 Drawing Sheet

(58) Field of Classification Search
CPC ............ B23K 2101/36; B23K 2101/42; B23K 3/0669; B23K 3/0676; B23K 1/0053; B23K 1/008; B23K 1/012; B23K 1/018; B23K 1/06; B23K 1/19; B23K 1/206; B23K 2101/14; B23K 2103/04; B23K 2103/05; B23K 2103/08; B23K 2103/10; B23K 2103/12; B23K 2103/14; B23K 2103/26; B23K 2103/52; B23K 2103/54; B23K 35/262; B23K 3/02; B23K 3/06; B23K 3/0638; B23K 3/0661; B23K 9/02
See application file for complete search history.

(56) References Cited

U.S. PATENT DOCUMENTS

| | | | | |
|---|---|---|---|---|
| 4,616,775 | A | * | 10/1986 | Simonetti ............ B23K 3/0676 228/37 |
| 5,361,963 | A | * | 11/1994 | Ozawa ................ B23K 3/0607 118/256 |
| 5,439,158 | A | * | 8/1995 | Sund ...................... B23K 1/008 228/37 |
| 5,829,668 | A | | 11/1998 | George et al. |
| 2012/0325899 | A1 | * | 12/2012 | Willemen ............ B23K 3/0653 228/203 |
| 2018/0185946 | A1 | * | 7/2018 | Degura .................... H05K 3/34 |

FOREIGN PATENT DOCUMENTS

| WO | WO-2008067620 A1 | * | 6/2008 | ............. C23C 2/003 |
|---|---|---|---|---|
| WO | WO-2016207971 A1 | * | 12/2016 | ........... H05K 3/3447 |

OTHER PUBLICATIONS

PCT Notification of Transmittal of the International Search Report and the Written Opinion of the International Searching Authority, International App No. PCT/EP2018/056546, dated Aug. 30, 2018, 14 pages.

Machine translation of JPH01122127, dated May 15, 1989, 4 pages.

* cited by examiner

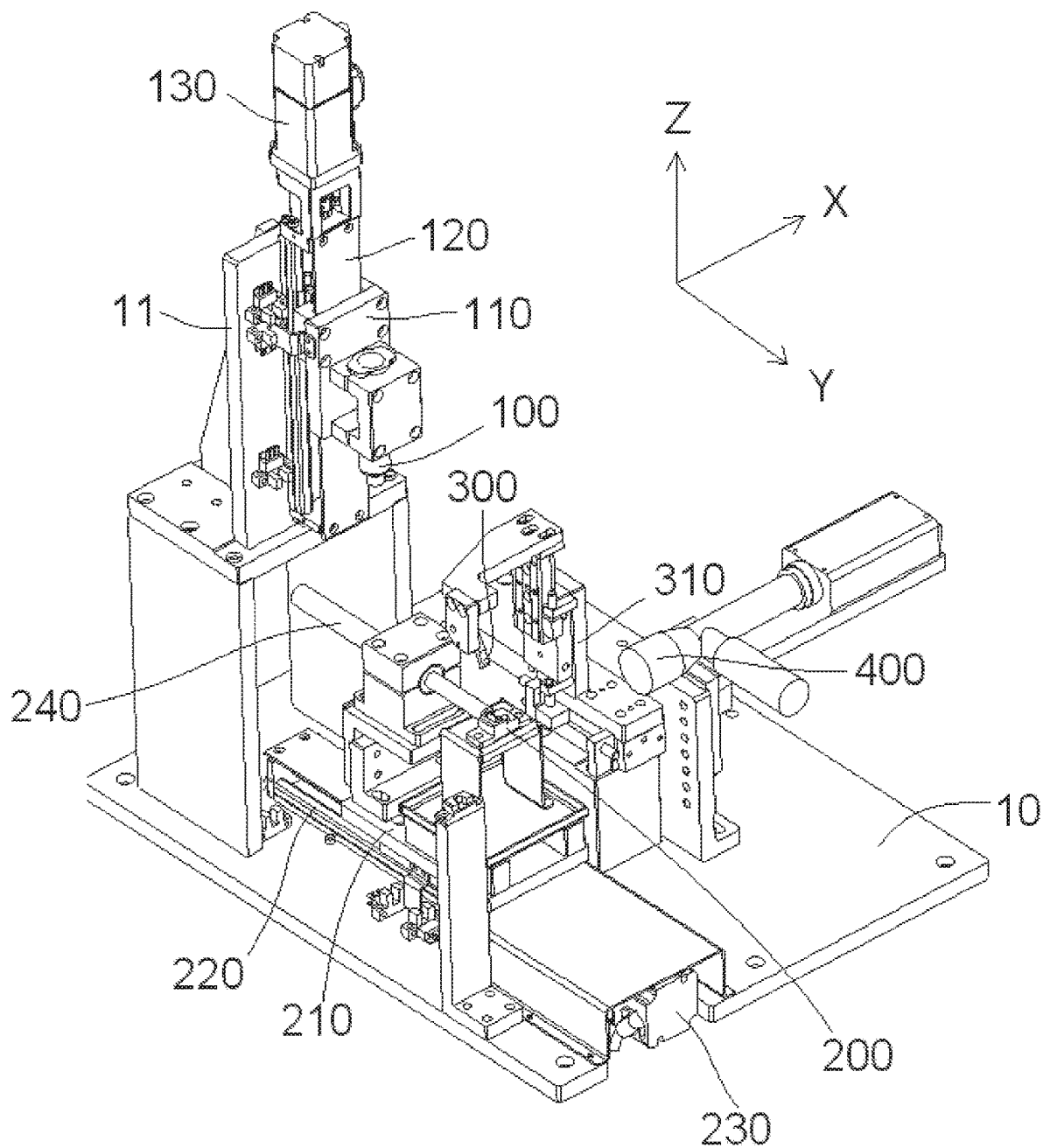

AUTOMATIC SOLDER PASTE FEEDING SYSTEM

CROSS-REFERENCE TO RELATED APPLICATIONS

This application is a continuation of PCT International Application No. PCT/EP2018/056546 filed on Mar. 15, 2018, which claims priority under 35 U.S.C. § 119 to Chinese Patent Application No. 201710160006.9 filed on Mar. 17, 2017.

FIELD OF THE INVENTION

The present invention relates to an automatic solder paste feeding system.

BACKGROUND

In the field of manufacturing an electrical device, solder paste is often used, for example, to weld a lead or a pin of the electrical device. In the prior art, the solder paste is generally manually coated on the lead or pin of the electrical device to be welded in advance. Then, the coated solder paste is heated and melted into liquid state by a solder head. After the solder paste is cooled and solidified, the operation of welding the lead or pin of the electrical device is finished.

However, the efficiency of manually supplying the solder paste is very low, which is only suitable for welding a single electrical product and not suitable for welding electrical products in mass.

SUMMARY

An automatic solder paste feeding system, constructed in accordance with the present invention, includes a base, a container mounted on the base and configured to contain a solder paste therein. This automatic solder past feeding system also includes a syringe mounted on the base and configured to inject the solder paste into the container and a heater mounted on the base and configured to heat the solder paste contained in the container, so that the solder paste is melted into liquid state.

BRIEF DESCRIPTION OF THE DRAWING

The above and other features of the present invention will become more apparent by describing in detail an exemplary embodiment thereof with reference to the accompanying drawings in which FIG. 1 is a perspective view of an automatic solder paste feeding system according to an embodiment of the present invention.

DETAILED DESCRIPTION OF THE EMBODIMENT(S)

An embodiment of the present invention will be described hereinafter in detail with reference to the attached drawing. The present invention may, however, be embodied in many different forms and should not be construed as being limited to the embodiment set forth herein; rather, this embodiment is provided so that the present disclosure will convey the concept of the invention to those skilled in the art.

In the following detailed description, for purposes of explanation, numerous specific details are set forth in order to provide a thorough understanding of the disclosed embodiment. It will be apparent, however, that one or more embodiments may be practiced without these specific details. In other instances, well-known structures and devices are schematically shown in order to simplify the drawing.

FIG. 1 is an illustrative perspective view of an automatic solder paste feeding system according to an exemplary embodiment of the present invention.

As shown in FIG. 1, the automatic solder paste feeding system mainly comprises a base 10, a container 200, a syringe 100, and a heater 240. The container 200 is mounted on the base 10 and contains a solder paste therein. The syringe 100 is mounted on the base 10 and injects the solder paste into the container 200. The heater 240 is mounted on the base 10 and heats the solder paste in the container 200, so that the solder paste is melted into liquid state. The melted solder paste may be coated on a lead or pin of an electrical device to be welded to another lead, pin or pad. After the solder paste is cooled and solidified, the lead or pin of the electrical device is soldered and electrically connected to the other lead, pin or pad.

As shown in FIG. 1, the automatic solder paste feeding system further comprises a first moving mechanism 110, 120, 130 mounted on a support frame 11 of the base 10 and moves the syringe 100 in a vertical direction Z perpendicular to the base 10, so as to move the syringe 100 to an injection position. When the syringe 100 is moved to the injection position, an injection port (a lower port) of the syringe 100 is driven to enter into the container 200. In this way, the solder paste may be directly injected into the container 200 by the syringe 100.

As shown in FIG. 1, the first moving mechanism 110, 120, 130 mainly comprises a first rail 120, a first sliding block 110, and a first driving device 130. The first rail 120 is mounted on the support frame 11. The first sliding block 110 is slidably mounted on the first rail 120 and movable along the first rail 120 in the vertical direction Z. The first driving device 130 is mounted on the support frame 11 or the first rail 120.

As shown in FIG. 1, the syringe 100 is mounted on the first sliding block 110 and the first driving device 130 drives the first sliding block 110 and the syringe 100 to slide along the first rail 120.

As shown in FIG. 1, the automatic solder paste feeding system further comprises a second moving mechanism 210, 220, 230. The second moving mechanism 210, 220, 230 is mounted on the base 10 and adapted to move the container 200 in a horizontal direction Y parallel to the base 10, so as to move the container 200 to an injection station. When the container 200 is moved to the injection station, the syringe 100 is aligned to the container 200 in the vertical direction Z.

As shown in FIG. 1, the second moving mechanism 210, 220, 230 mainly comprises a second rail 220, a second sliding block 210, and a second driving device 230. The second rail 220 is mounted on the base 10. The second sliding block 210 is slidably mounted on the second rail 220 and movable along the second rail 220 in the horizontal direction Y The second driving device 230 is mounted on the base 10.

As shown in FIG. 1, the container 200 is mounted on the second sliding block 210 and the second driving device 230 is adapted to drive the second sliding block 210 and the container 200 to slide along the second rail 220 in the horizontal direction Y.

As shown in FIG. 1, heater 240 is mounted on the second sliding block 210, so as to slide along the second rail 220 with the second sliding block 210.

As shown in FIG. 1, the automatic solder paste feeding system further comprises a cleaning brush 300. The cleaning brush 300 is mounted on the base 10 and removes impurities from a top surface of the solder paste contained in the container 200.

As shown in FIG. 1, the automatic solder paste feeding system further comprises a vision system 400 mounted on the base 10 and detects the impurities on the top surface of the solder paste contained in the container 200. The cleaning brush 300 removes the impurities from the top surface of the solder paste contained in the container 200 in time when the vision system 400 detects the impurities. Thus, it may improve the welding quality.

As shown in FIG. 1, the automatic solder paste feeding system further comprises a third moving mechanism 310 mounted on the base 10 and moves the cleaning brush 300 in the vertical direction Z and/or the horizontal direction Y, so as to move the cleaning brush 300 to an cleaning position. When the cleaning brush 300 is moved to the cleaning position, the cleaning brush 300 contacts the top surface the solder paste contained in the container 200. In this way, the impurities on the top surface of the solder paste in the container 200 may be removed by the cleaning brush 300.

As shown in FIG. 1, the vision system 400 detects the impurities on the top surface the solder paste contained in the container 200 and the third moving mechanism 310 moves the cleaning brush 300 to the cleaning position under guidance of the vision system 400, so as to remove the impurities from the top surface the solder paste contained in the container 200 by the cleaning brush 300.

As shown in FIG. 1, the syringe 100 is an electric control syringe and is controlled so that the amount of the solder paste injected by the syringe 100 at a single time just fully fills the container 200. In this way, the amount of solder paste injected into the container 200 may be accurately controlled, thereby avoiding the waste of solder paste.

The first driving device 130 and the second driving device 230 may be hydraulic cylinders, gas cylinders, or a motor drive mechanism. The vision system 400 may comprise one or more cameras.

There is provided an automatic solder paste feeding system that automatically feeds the solder paste in high efficiency and suitable for welding electrical products in mass.

In the above exemplary embodiment of the present invention, the solder paste may be automatically fed by the automatic solder paste feeding system, improving the feeding efficiency of the solder paste. The automatic solder paste feeding system performs automatic welding for large quantities of electrical products.

It should be appreciated by those skilled in this art that the above embodiment is intended to be illustrative and not restrictive. Many modifications may be made to the above embodiment of the present invention by those skilled in this art and various features described in the embodiment may be freely combined with each other without conflicting in configuration or principle.

Although an exemplary embodiment has been shown and described, it will be appreciated by those skilled in the art that various changes or modifications may be made without departing from the principles and spirit of the present invention, the scope of which is defined in the claims and their equivalents.

As used herein, an element recited in the singular and proceeded with the word "a" or "an" should be understood as not excluding plurals of said elements, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, "comprising" or "having" an element or a plurality of elements having a particular property may include additional such elements not having that property.

What is claimed is:

1. An automatic solder paste feeding system, comprising:
   a base;
   a support frame on the base;
   a container mounted on the base and configured to contain a solder paste therein;
   a syringe mounted on the base and configured to inject the solder paste into the container;
   a cleaning brush mounted on the base and adapted to remove impurities from a top surface of the solder paste contained in the container;
   a first moving mechanism mounted on the support frame of the base and adapted to move the syringe in a vertical direction perpendicular to the base, so as to move the syringe to an injection position, wherein when the syringe is moved to the injection position an injection port of the syringe is driven to enter into the container;
   a second moving mechanism mounted on the base and adapted to move the container in a horizontal direction parallel to the base between an injection station, wherein the syringe is aligned with the container in the vertical direction, and a second cleaning position, wherein the container is arranged adjacent the cleaning brush; and
   a heater mounted on the base and configured to heat the solder paste contained in the container, so that the solder paste is melted into liquid state.

2. The automatic solder paste feeding system according to claim 1, wherein:
   (a) the first moving mechanism comprises:
      (1) a first rail mounted on the support frame,
      (2) a first sliding block slidably mounted on the first rail and movable along the first rail in the vertical direction, and
      (3) a first linear actuator mounted on the support frame or the first rail, and
   (b) the syringe is mounted on the first sliding block, and
   (c) the first linear actuator is adapted to drive the first sliding block and the syringe to slide along the first rail.

3. The automatic solder paste feeding system according to claim 2, wherein:
   (a) the second moving mechanism comprises:
      (1) a second rail mounted on the base,
      (2) a second sliding block slidably mounted on the second rail and movable along the second rail in the horizontal direction, and
      (3) a second linear actuator mounted on the base, and
   (b) the container is mounted on the second sliding block, and
   (c) the second linear actuator is adapted to drive the second sliding block and the container to slide along the second rail.

4. The automatic solder paste feeding system according to claim 3, wherein the heater is mounted on the second sliding block to slide along the second rail with the second sliding block.

5. The automatic solder paste feeding system according to claim 1:

(a) further comprising a vision system mounted on the base and configured to detect the impurities on the top surface of the solder paste contained in the container, and (b) wherein the cleaning brush is adapted to remove the impurities from the top surface of the solder paste contained in the container in time when the vision system detects the impurities.

6. The automatic solder paste feeding system according to claim 5:

(a) further comprising a third moving mechanism mounted on the base and adapted to move the cleaning brush in the vertical direction and/or the horizontal direction, so as to move the cleaning brush to a cleaning position, and (b) wherein when the cleaning brush is moved to the cleaning position, the cleaning brush makes contact with the top surface the solder paste contained in the container.

7. The automatic solder paste feeding system according to claim 6, wherein, when the vision system detects the impurities on the top surface the solder paste contained in the container, the third moving mechanism moves the cleaning brush to the cleaning position under guidance of the vision system, so as to remove the impurities from the top surface the solder paste contained in the container by the cleaning brush.

8. The automatic solder paste feeding system according to claim 1, wherein the syringe comprises an electric control syringe and is controlled so that the amount of the solder paste injected by the syringe at a single time just fully fills the container.

9. An automatic solder paste feeding system, comprising:
a base;
a container mounted on the base and configured to contain a solder paste therein;
an electric control syringe mounted on the base and configured to inject the solder paste into the container, wherein the syringe is controlled so as to fill the container to a predetermined depth;
a cleaning brush mounted on the base and adapted to remove impurities from a top surface of the solder paste contained in the container;
a heater mounted on the base and configured to heat the solder paste contained in the container, so that the solder paste is melted into liquid state; and
a moving mechanism mounted on the base and adapted to move the container in a horizontal direction relative to the base between at least a first injection position, wherein the syringe is aligned with the container in the vertical direction, and a second cleaning position, wherein the container is arranged adjacent the cleaning brush.

10. The automatic solder paste feeding system according to claim 9, wherein the moving mechanism moves the container independently from the cleaning brush such that the cleaning brush is not moved by the movement of the container by the moving mechanism.

11. An automatic solder paste feeding system, comprising:
a base;
a support frame mounted on a first end of the base;
a container mounted on the base and configured to contain a solder paste therein;
an electric control syringe mounted on the base and configured to automatically inject the solder paste into the container;
a cleaning brush mounted on the base and adapted to remove impurities from a top surface of the solder paste contained in the container;
a first moving mechanism mounted on the support frame of the base and including a first actuator adapted to automatically move the syringe in a vertical direction perpendicular to the base for selectively moving the syringe into an injection position, wherein in the injection position an injection port of the syringe is arranged within the container;
a second moving mechanism mounted on the base and including a second actuator arranged on a second end of the base opposite the first end and adapted to automatically move the container in a horizontal direction parallel to the base between at least the injection position, wherein the syringe is aligned with the container in the vertical direction, and a second cleaning position, wherein the container is arranged adjacent the cleaning brush;
a third moving mechanism mounted between the first end and the second end of the base and including a third actuator adapted to automatically move the cleaning brush in the vertical direction and the horizontal direction, so as to move the cleaning brush to a cleaning position, wherein when the cleaning brush is moved to the cleaning position, the cleaning brush makes contact with the top surface the solder paste contained in the container;
a heater mounted on the base and configured to heat the solder paste contained in the container, so that the solder paste is melted into liquid state; and
a vision system mounted between the first end and the second end of the base proximate the third moving mechanism and configured to detect the impurities on the top surface of the solder paste contained in the container when the container is in the cleaning position, wherein the cleaning brush is adapted to remove the impurities from the top surface of the solder paste contained in the container when the vision system detects the impurities.

\* \* \* \* \*